(12) United States Patent
Kim

(10) Patent No.: US 12,399,362 B2
(45) Date of Patent: Aug. 26, 2025

(54) HEAD-UP DISPLAY DEVICE

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 547 days.

(21) Appl. No.: 17/859,113

(22) Filed: Jul. 7, 2022

(65) Prior Publication Data

US 2023/0072417 A1 Mar. 9, 2023

(30) Foreign Application Priority Data

Sep. 6, 2021 (KR) .................. 10-2021-0118428

(51) Int. Cl.
| | |
|---|---|
| *G02B 27/01* | (2006.01) |
| *B60K 35/00* | (2024.01) |
| *B60K 35/23* | (2024.01) |
| *B60K 35/28* | (2024.01) |
| *G02B 27/00* | (2006.01) |

(52) U.S. Cl.
CPC ..... *G02B 27/0149* (2013.01); *G02B 27/0006* (2013.01); *G02B 27/0101* (2013.01); *B60K 35/00* (2013.01); *B60K 35/23* (2024.01); *B60K 35/28* (2024.01); *B60K 2360/166* (2024.01); *B60K 2360/167* (2024.01); *G02B 2027/011* (2013.01); *G02B 2027/0141* (2013.01); *G02B 2027/0154* (2013.01)

(58) Field of Classification Search
CPC ............ G02B 27/0149; G02B 27/0179; G02B 27/0006; G02B 2027/0154; G02B 2027/0159; G02B 2027/0161; G02B 2027/0169; G02B 2027/0181; G02B 2027/0198; G02B 7/003; G02B 7/004
USPC ......................................................... 359/514
See application file for complete search history.

(56) References Cited

U.S. PATENT DOCUMENTS

| | | | |
|---|---|---|---|
| 7,571,956 B2 * | 8/2009 | Gunther ................ | B62D 25/14 296/70 |
| 2020/0225472 A1 * | 7/2020 | Aoki .................. | G02B 27/0149 |
| 2021/0129671 A1 * | 5/2021 | Miyake ................. | B60K 35/60 |
| 2021/0364734 A1 * | 11/2021 | Kim ........................ | B60K 35/00 |

FOREIGN PATENT DOCUMENTS

DE 102016001232 A1 * 8/2016

* cited by examiner

*Primary Examiner* — Wyatt A Stoffa
*Assistant Examiner* — Seth D Moser
(74) *Attorney, Agent, or Firm* — Novo TechIP International PLLC

(57) ABSTRACT

According to at least one aspect, the present disclosure provides a head-up display device comprising: a housing including a receiving space within; a picture generation unit (PGU) disposed within the housing, for projecting an image related to vehicle driving information; one or more reflection members for reflecting an image projected from the PGU; a fixing member formed to be fixed to a vehicle body; and one or more length adjustment members coupled to the fixing member, for movably supporting the housing.

16 Claims, 9 Drawing Sheets

HEAD-UP DISPLAY DEVICE

CROSS-REFERENCE TO RELATED APPLICATIONS

This application claims priority to and the benefit of Korean Patent Application No. 10-2021-0118428, filed on Sep. 6, 2021, the disclosure of which is incorporated herein by reference in its entirety.

BACKGROUND

1. Technical Field

The present disclosure relates to a head-up display device.

2. Discussion of Related Art

This section provides background information related to the present disclosure which is not necessarily prior art.

A head-up display (HUD) is a device that projects various information related to driving of a vehicle, such as current speed, navigation, and amount of fuel, onto a windshield so that the driver can see it. Using the head-up display, the driver is able to view information related to driving of the vehicle and therefore look forward without having to refocus and shift attention often during driving.

The head-up display may include a housing with a receiving space formed within, a light source for emitting light, a liquid crystal display (LCD) for projecting an image, a reflection member, a cover, and so on. The head-up display is installed under the windshield of the vehicle because of its features.

An image displayed on the windshield of the vehicle is produced using components such as a light source, an LCD, and a reflection member. The image may be distorted due to the tolerance of each component, or the image may be displayed outside the driver's field of vision.

Conventionally, the tolerances of the components are minimized in the manufacturing process, in order to prevent an image on a head-up display from being distorted or displayed outside the driver's field of vision. After the manufacturing process of the components, calibration equipment and software are used to correct a distorted image or change the position of an image.

Minimizing the tolerances of components is inconvenient because tight tolerance control is required in the manufacturing process of the components. After the manufacturing process, it is not possible for a service center for maintenance and repair of the head-up display to correct a distorted image or change the position of an image.

Correcting an image using calibration equipment and software is problematic in that the calibration equipment is expensive and special training is required to use the calibration equipment and software.

SUMMARY

According to at least one aspect, the present disclosure provides a head-up display device comprising: a housing including a receiving space within; a picture generation unit (PGU) disposed within the housing, for projecting an image related to vehicle driving information; one or more reflection members for reflecting an image projected from the PGU; a fixing member formed to be fixed to a vehicle body; and one or more length adjustment members coupled to the fixing member, for movably supporting the housing.

DETAILED DESCRIPTION

Figure 1:
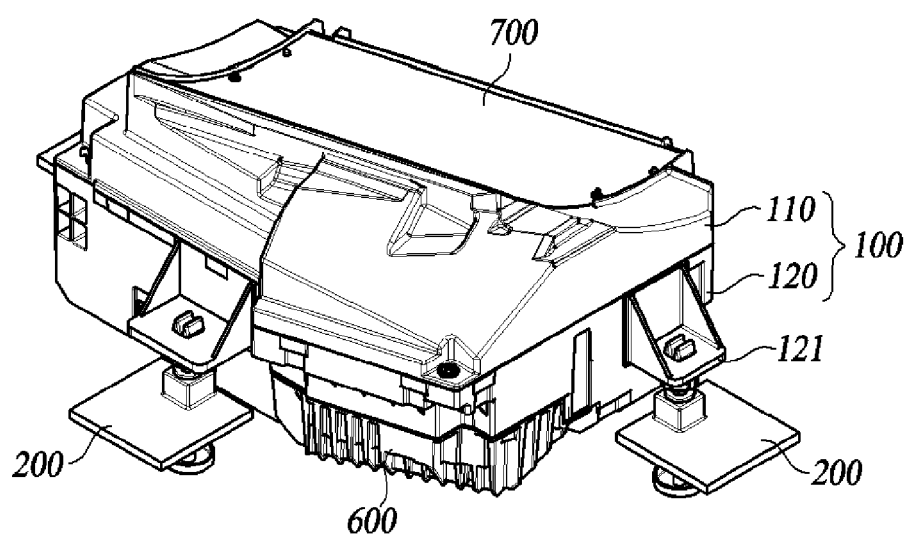
FIG. 1 is an assembled head-up display device according to an embodiment of the present disclosure.

A head-up display device according to an embodiment of the present disclosure allows avoiding the inconvenience of tight tolerance control and enables a service center or the like to correct a distorted image or change the position of an image, by installing one or more length adjustment members so that the housing is moved.

A head-up display device according to an embodiment of the present disclosure is capable of correcting a distorted image or changing the position of an image using calibration equipment and software for this purpose, by installing one or more length adjustment members so that the housing is moved.

The aspects of the present disclosure are not limited to the foregoing, and other aspects not mentioned herein will be able to be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is an assembled head-up display device according to an embodiment of the present disclosure.

Figure 2:
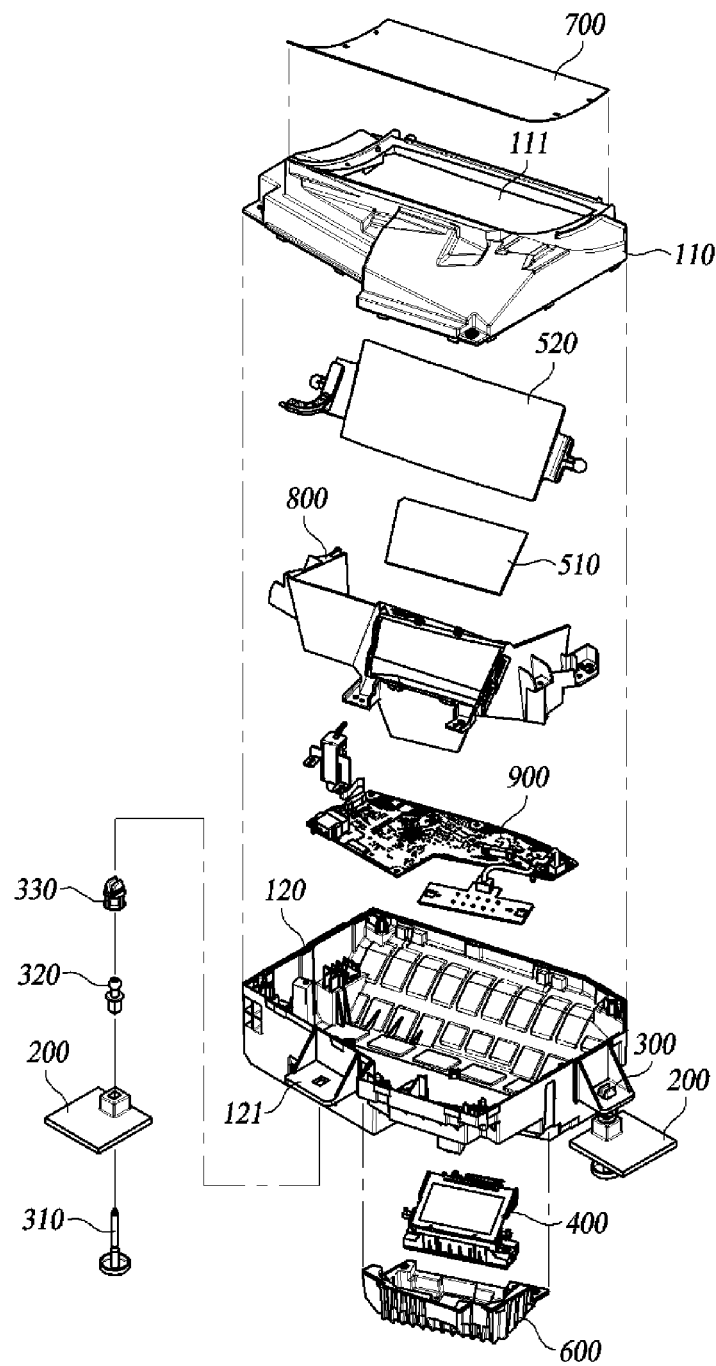
FIG. 2 is an exploded perspective view of a head-up display device according to an embodiment of the present disclosure.

FIG. 2 is an exploded perspective view of a head-up display device according to an embodiment of the present disclosure.

Figure 3:
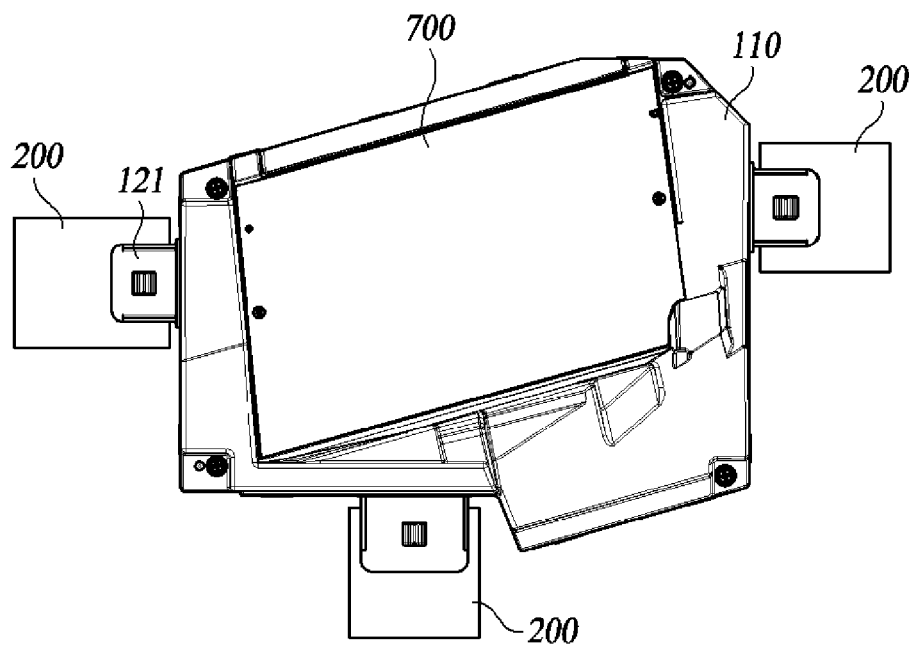
FIG. 3 is a plan view of a head-up display device according to an embodiment of the present disclosure.

FIG. 3 is a plan view of a head-up display device according to an embodiment of the present disclosure.

Figure 4:
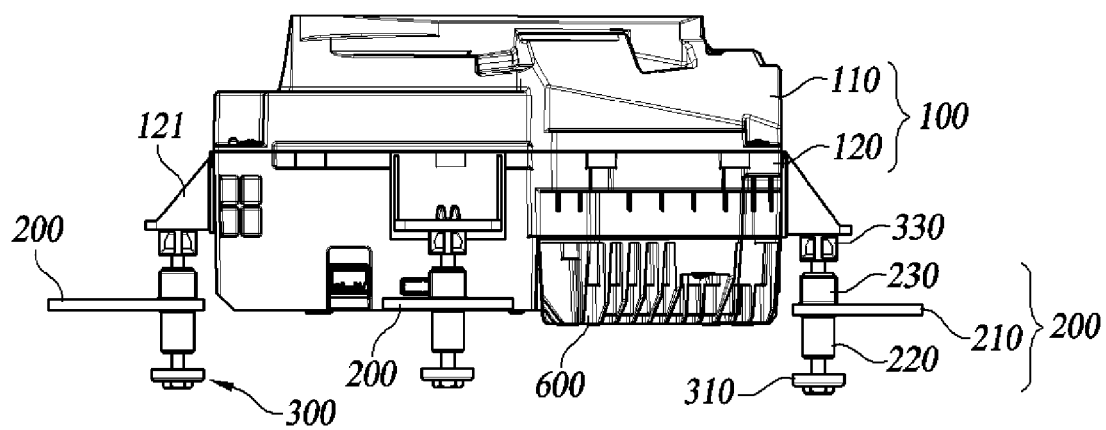
FIG. 4 is a rear view of a head-up display device according to an embodiment of the present disclosure.

FIG. 4 is a rear view of a head-up display device according to an embodiment of the present disclosure.

Figure 5:
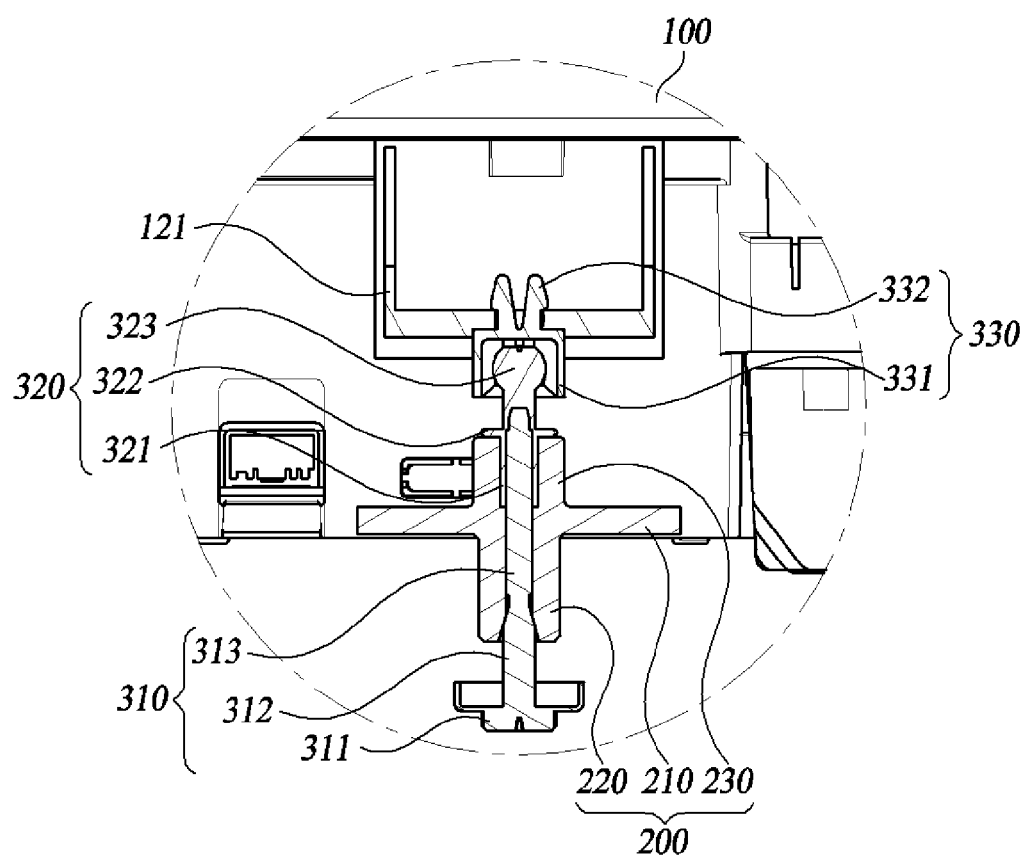
FIG. 5 is a view showing an internal structure of a fixing member and a length adjustment member according to an embodiment of the present disclosure.

FIG. 5 is a view showing an internal structure of a fixing member and a length adjustment member according to an embodiment of the present disclosure.

Referring to FIGS. 1 to 5, a head-up display device according to an embodiment of the present disclosure may include a housing 100, a fixing member 200, a length adjustment member 300, a picture generation unit (PGU) 400, a reflection member 500, a heat sink 600, a dust cover 700, a screen 800, and a printed circuit board (PCB) 900.

The housing 100 may include an upper case 110 and a lower case 120.

The upper case 110 may include a penetration part 111, and the lower case 120 may include a fastening hole 121.

The fixing member 200 may include a support part 210, a first insertion hole 220, and a second insertion hole 230.

The length adjustment member 300 may include an aiming bolt 310, a moving member 320, and a joint 330.

The aiming bolt 310 may include a head part 311, a body part 312, and a first insertion part 313.

The moving member may include a first receptacle 321, a connection part 322, and a second insertion part 323.

The joint 330 may include a second receptacle 331 and a fastening part 332.

The reflection member 500 may include a first mirror 510 and a second mirror 520.

The housing 100 is a member with a receiving space formed within, and the PGU 400, the reflection member 500, the PCB 900, etc. are disposed within the housing 100. The housing 100 may include an upper case 110 and a lower case 120. The penetration part 111 may be formed in at least part of the upper case 110, and at least one fastening hole 121 may be formed in the lower case 120.

The penetration part 111 is a member that is formed in at least part of the upper case 110 to allow light to pass through. As the penetration part 111 is formed in the upper case 110, an image related to vehicle driving information to be transferred using the PGU 400 and the reflection member 500 may be displayed on the windshield of the vehicle. The dust cover 700 may be installed over the penetration part 111. The dust cover 700 prevents foreign matters such as dust from getting inside the housing 100.

The fastening hole 121 may be formed in a plural form at the front, rear, and side of the lower case 120. With the fastening part 332 being inserted and extending into the fastening hole 121, the lower case 120 and the length adjustment member 300 are coupled together. The housing 100 including the lower case 120 may be moved as the length of the length adjustment member 300 changes, thereby correcting a distorted image on the head-up display device. However, the fastening hole 121 is not necessarily formed in the lower case 120, but may be formed in the lower case 110 depending on the purpose and use.

The fixing member 200 is fixed to a vehicle body, and is coupled to the housing 100 and the length adjustment member 300. The fixing member 200 may support the housing 100 in such a way that the housing 100 is moved at least one point by using the length adjustment member 300, and may include a support part 210, a first insertion hole 220, and a second insertion hole 230.

The support part 210 is a member that supports the housing 100 and the length adjustment member 300, and is formed in such a way as to be fixed to the vehicle body. The support part 210 may be formed in the shape of a plate so as to stably support the housing 100 and the length adjustment member 300. The first insertion hole 220 and the second insertion hole 230 may be formed on both sides of the support part 210, respectively.

The first insertion hole 220 may be formed on one side of the support part 210 in the shape of a hollow cylinder. The aiming bolt 310 is inserted and extending into the first insertion hole 220. One end of the first insertion hole 220 may be smaller in inner diameter than the diameter of the body part 312, so as to keep the aiming bolt 310 from being moved into the first insertion hole 220 when it rotates.

One end of the first insertion hole 220 is formed in the shape of a nozzle in which its inner diameter becomes gradually smaller. Since one end of the first insertion hole 220 is formed in the shape of a nozzle, the aiming bolt 310 is kept from being moved into the first insertion hole 220 when it rotates. However, one end of the first insertion hole 220 is not necessarily limited to the nozzle shape, but may have other shapes, including a shape in which a holder is installed to keep the aiming bolt 310 from being moved into the first insertion hole 220 when it rotates.

The second insertion hole 230 may be formed on one side of the support part 210 in the shape of a square or rectangular cylinder. The first receptacle 321 of the moving member 320 is inserted and extending into the second insertion hole 230. When the moving member 320 moves along with the rotation of the aiming bolt 310, the second insertion hole 230 may guide the movement of the moving member 320. The second insertion hole 230 may be equal in length to the first receptacle 321. Since the second insertion hole 230 is equal in length to the first receptacle 321, the moving member 320 may be prevented from being inserted too far into the second insertion hole 230.

The length adjustment member 300 is a member that is coupled to the fixing member 200 and movably supports the housing 100. The housing 100 may be moved as the length of the length adjustment member 300 changes. The length adjustment member 300 may be provided in a plural form. Using a plurality of length adjustment members 300, the housing 100 may be moved at various angles, thereby correcting a distorted image on the head-up display device or changing the position of an image. The length adjustment member 300 may include an aiming bolt 310, a moving member 320, and a joint 330.

The aiming bolt 310 is installed in such a way as to pass through the first insertion hole 220 and second insertion hole 230 of the fixing member 200, with at least part of it being inserted and extending into the moving member 320. The aiming bolt 310 is supported by one end of the first insertion hole 220 so as to be kept from being moved into the first insertion hole 220 when it rotates. As the aiming bolt 310 rotates, the moving member 320 and the joint 330 may be moved, and as a result, the housing 100 may be moved. The aiming bolt 310 may be provided in a plural form, and may include a head part 311, a body part 312, and an insertion part 313.

The head part 311 is larger in diameter than the body part 312 and the first insertion part 313. A groove may be formed in the head part 311 so that the aiming bolt 310 is rotated by using a tool such as a screwdriver.

The body part 312 is a member that is formed with the head part 311 connected to it, and may be rotated by the head part 311. One end of the body part 312 is formed in the shape of a nozzle in which its inner diameter becomes gradually smaller. The body part 312 is kept from being moved into the first insertion hole 220 as it is supported by one end of the first insertion hole 220.

The first insertion part 313 is a member that is formed with the body part 312 connected to it, and may be rotated by the head part 311 and the body part 312. At least part of the first insertion part 313 is inserted and extending into the first receptacle 321 of the moving member 320. As the first insertion part 313 is inserted and extending into the moving member 320 and rotates, the moving member 320 may be moved.

The moving member 320 is a member that is formed to move along with the rotation of the aiming bolt 310. The aiming bolt 310 is inserted and extending into one end of the moving member 320, and the other end is inserted and extending into the joint 330. At least part of the moving member 320 may be inserted and extending into the second insertion hole 230 of the fixing member 200. The moving member 320 may be provided in a plural form, and may include a first receptacle 321, a connection part 322, and a second insertion part 323.

The first receptacle 321 is formed in the shape of a square cylinder, and may include a circular-shaped hollow. The first insertion part 313 is inserted and extending into the hollow of the first receptacle 321. As the first insertion part 313 is inserted and extending into the first receptacle 321, the moving member 320 may move along with the rotation of the aiming bolt 310. The first receptacle 321 may be inserted and extending into the second insertion hole 230 of the fixing member 200, and may be equal in length to the second insertion hole 230. As the first receptacle 321 is inserted and extending into the second insertion hole 230, the second insertion hole 230 may guide the movement of the moving member 320.

The connection part 322 is formed between the first receptacle 321 and the second insertion part 323. The connection part 322 moves along with the first receptacle 321 and the second insertion part 323 as the aiming bolt 310 rotates. The connection part 322 is formed in the shape of a circular plate whose diameter is longer than the diagonal length of the second insertion hole 230. Since the connection part 322 is formed between the first receptacle 321 and the second insertion part 323, the moving member 320 may be prevented from being inserted too far into the second insertion hole 230. However, the connection part 322 is not necessarily limited to the circular plate shape, but may have other shapes depending on the purpose and use.

The second insertion part 323 is formed with the connection part 322 connected to it. The second insertion part 323 moves along with the first receptacle 321 and the connection part 322 as the aiming bolt 310 rotates. One end of the second insertion part 323 may be formed in the shape of a sphere. At least part of the second insertion part 323 is inserted and extending into the second receptacle 331 of the joint 330. The second insertion part 323 and the second receptacle 331 may be coupled together in such a way as to cover and fix a sphere-shaped member formed on one end of the second insertion part 323.

The joint 330 is a member that is formed to be connected to the moving member 320. At least part of the moving member 320 is inserted and extending into one end of the joint 330, and the other end is inserted and extending into the fastening hole 121 formed in the lower case 120. As the aiming bolt 310 rotates, the moving member 320 and the joint 330 may be moved, and as a result, the housing 100 may be moved. The joint 330 may be provided in a plural form, and may include a second receptacle 331 and a fastening part 332.

The second receptacle 331 is a member that is formed in such a way that the second insertion part 323 of the moving member 320 is inserted in it, and moves along with the moving member 320 as the aiming bolt 310 rotates. The second receptacle 331 may be formed in such a way as to cover a sphere-shaped member formed on one end of the second insertion part 323.

The fastening part 332 is a member that is formed with the second receptacle 331 connected to it, and moves along with the second receptacle 331 as the moving member 320 moves. With the fastening part 332 being inserted and extending into the fastening hole 121 formed in the lower case 120, the housing 100 and the length adjustment member 300 are coupled together. At least part of the fastening part 332 may be curved so that the fastening part 332 is inserted and fixed into the fastening hole 121. Since the housing 100 and the length adjustment member 300 are coupled together using the fastening part 332 and the fastening hole 121, the housing 100 may be moved as the length of the length adjustment member 300 changes.

The PGU 400 is a member that is formed to project an image related to vehicle driving information. The PGU 400 may include a light source, a diffuser, and a liquid crystal display (LCD). The PGU 400 is disposed within the housing 100.

The reflection member 500 is a member that is formed to reflect an image projected from the PGU 400, and may be provided in a plural form. The reflection member 500 may include a first mirror 510 and a second mirror 520.

The first mirror 510 is a member that reflects an image projected from the PGU 400 transfers it to the second mirror 520. The first mirror 510 is disposed within the housing 100.

The second mirror 520 is a member that reflects an image transferred from the first mirror 510 and displays it on the windshield of the vehicle. The second mirror 520 is disposed within the housing 100.

The heat sink 600 is a member that is formed to release heat generated from the light source or the like of the PGU 400. The heat sink 600 may include a plurality of fins to promote active heat exchange with the outside. Since heat is released from the housing 100 using the heat sink 600, the lifetime of each component of the head-up display device may be lengthened.

The dust cover 700 is a member for preventing foreign matters such as dust from getting into the housing 100, and may be installed on the penetration part 111 of the upper case 110. The dust cover 700 may be formed to allow light to pass through, and an image related to vehicle driving information reflected off the reflection member 500 may be displayed on the windshield of the vehicle.

Figure 6:
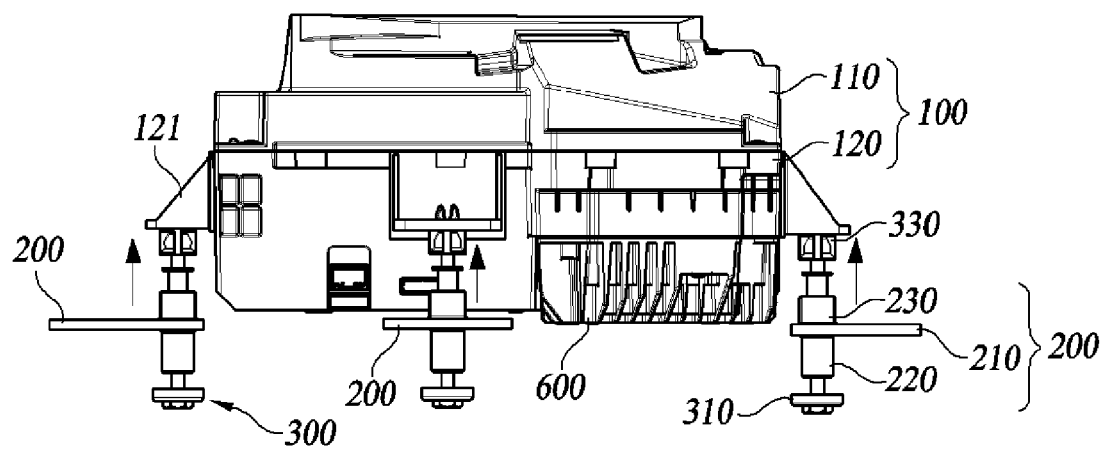
FIG. 6 is a view showing a first operating state of a head-up display device according to an embodiment of the present disclosure.

FIG. 6 is a view showing a first operating state of a head-up display device according to an embodiment of the present disclosure.

Figure 7:
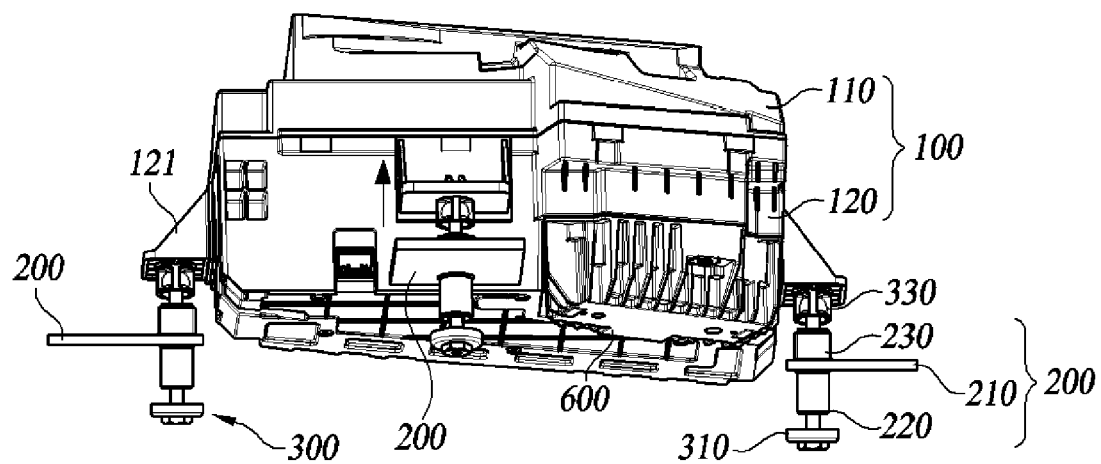
FIG. 7 is a view showing a second operating state of a head-up display device according to an embodiment of the present disclosure.
Figure 7:
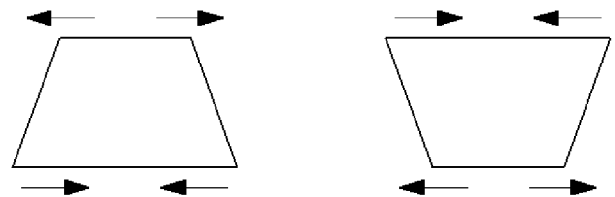

FIG. 7 is a view showing a second operating state of a head-up display device according to an embodiment of the present disclosure.

Figure 8:
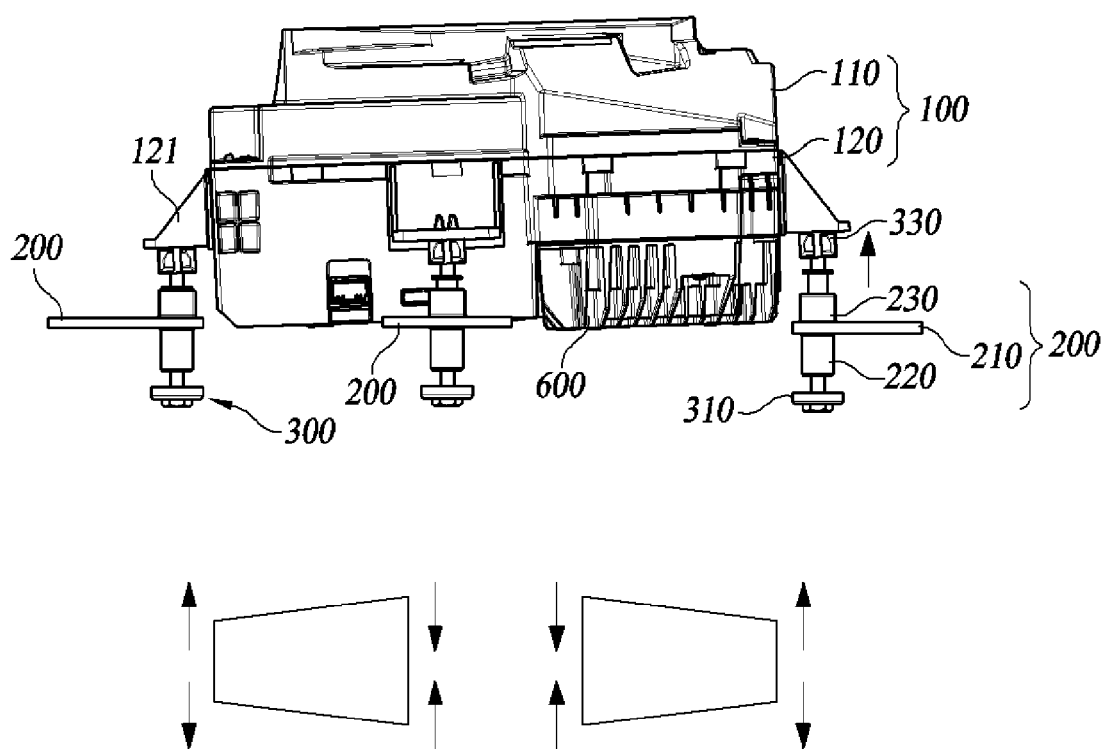
FIG. 8 is a view showing a third operating state of a head-up display device according to an embodiment of the present disclosure.

FIG. 8 is a view showing a third operating state of a head-up display device according to an embodiment of the present disclosure.

Figure 9:
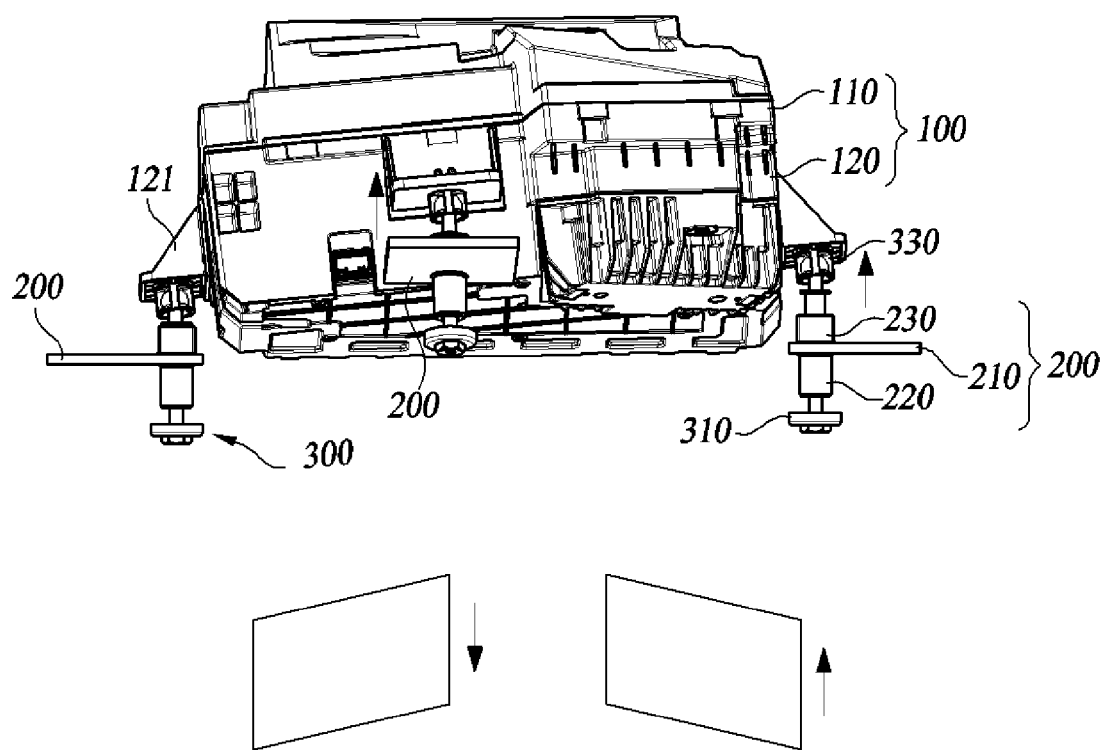
FIG. 9 is a view showing a fourth operating state of a head-up display device according to an embodiment of the present disclosure.

FIG. 9 is a view showing a fourth operating state of a head-up display device according to an embodiment of the present disclosure.

Referring to FIGS. 6 to 9, the operating principles and effects of a head-up display device according to an embodiment of the present disclosure will be described in detail.

The length adjustment member 300 is coupled to the fixing member 200 and movably supports the housing 100. A plurality of length adjustment members 300 may be installed on both sides and the rear of the housing 100 and support the housing 100 in such a way that the housing 100 is allowed to perform three-point movement. The length adjustment member 300 includes an aiming bolt 310, a moving member 320, and a joint 330. A first insertion part 313 of the aiming bolt 310 is inserted and extending into the moving member 320, and a second insertion part 323 of the moving member 320 is inserted and extending into the joint 330. The moving member 320 may move along with the rotation of the aiming bolt 310. As the moving member 320 moves, the joint 330 moves too. As a result, the entire length of the length adjustment member 300 may be extended, and the housing 100 coupled to the length adjustment member 300 may be moved.

Referring to FIG. 6, the lengths of the plurality of length adjustment members 300 installed on both sides and the rear of the housing 100 may change equally. As the lengths of the plurality of length adjustment members 300 installed on both sides and the rear of the housing 100 change equally, the housing 100 may be moved up and down while being maintained in a horizontal position. The magnification of an image related to vehicle driving information may be adjusted, and the position of an image displayed on the windshield may be changed.

Referring to FIG. 7, the length of the length adjustment member 300 installed on the rear of the housing 100 may change. As the length of the length adjustment member 300 installed on the rear of the housing 100 changes, a back portion of the housing 100 may be moved up and down. A trapezoidal image whose top and bottom sides are parallel may be corrected into a rectangular image.

Referring to FIG. 8, the lengths of the length adjustment members 300 installed on both sides of the housing 100 may change. As the lengths of the length adjustment members 300 installed on both sides of the housing 100 change, side portions of the housing 100 may be moved up and down. A trapezoidal image whose left and right sides are parallel may be corrected into a rectangular image.

Referring to FIG. 9, the lengths of the plurality of length adjustment members 300 installed on both sides and the rear of the housing 100 may change differently. As the lengths of the plurality of length adjustment members 300 installed on both sides and the rear of the housing 100 change differently, the housing 100 may be moved three points. A parallelogram image or the like may be corrected, or the position of an image may be changed.

A head-up display device according to an embodiment of the present disclosure is capable of correcting a distorted image or changing the position of an image by moving the housing 100 using a plurality of length adjustment members 300. This head-up display device allows avoiding the inconvenience of tight tolerance control in the manufacturing process of components, and enables image correction later at a service center. Also, this head-up display makes it possible to correct a distorted image and change the position of an image in a mechanical manner using the length adjustment members 300, without using calibration equipment and software which are expensive and require training.

According to an embodiment, a head-up display device has the effects of avoiding the inconvenience of tight tolerance control and enabling a service center or the like to correct a distorted image or change the position of an image, by installing one or more length adjustment members so that the housing is moved.

According to an embodiment, a head-up display device has the effect of correcting a distorted image or changing the position of an image using calibration equipment and software for this purpose, by installing one or more length adjustment member so that the housing is moved.

What is claimed is:

1. A head-up display device comprising:
   a housing having a receiving space;
   a picture generation unit (PGU) disposed at the receiving space of the housing and configured to project an image;
   one or more reflection members configured to reflect the image projected from the PGU;
   a fixing member coupled to a vehicle body; and
   one or more length adjustment members coupled to the fixing member and configured to movably support the housing,
   wherein each of the one or more length adjustment members includes at least one of an aiming bolt, a moving member, and a joint.

2. The head-up display device of claim 1, further comprising a penetration part at least partially disposed at the receiving space of the housing and configured to allow light to pass therethrough.

3. The head-up display device of claim 2, further comprising a dust cover disposed over the penetration part and configured to prevent foreign matter from entering into the receiving space of the housing.

4. The head-up display device of claim 1, wherein the fixing member has one or more insertion holes.

5. The head-up display device of claim 4, wherein the one or more insertion holes have a circular or square shape.

6. The head-up display device of claim 1, wherein the one or more length adjustment members is configured to support the housing in such a way that the housing is allowed to perform three-point movement.

7. The head-up display device of claim 1, wherein:
   at least part of the aiming bolt extends into the moving member,
   the moving member at least partially extend into the joint, and
   the moving member and the joint are configured to move along with a rotation of the aiming bolt.

8. The head-up display device of claim 1, wherein the aiming bolt includes a head part, a body part, and a first insertion part.

9. The head-up display device of claim 8, wherein one end of the body part has a nozzle shape.

10. The head-up display device of claim 8, wherein the first insertion part at least partially extends into the moving member.

11. The head-up display device of claim 1, wherein the moving member includes at least one of a first receptacle, a connection part, and a second insertion part.

12. The head-up display device of claim 11, wherein the first receptacle has a square cylinder shape.

13. The head-up display device of claim 11, wherein one end of the second insertion part has a spherical shape.

14. The head-up display device of claim 11, wherein the second insertion part at least partially extends into the joint.

15. The head-up display device of claim 1, wherein the joint includes a second receptacle and a fastening part.

16. The head-up display device of claim 15, wherein the housing has a fastening hole, and the fastening part extends into the fastening hole.

* * * * *